Patented Apr. 23, 1929.

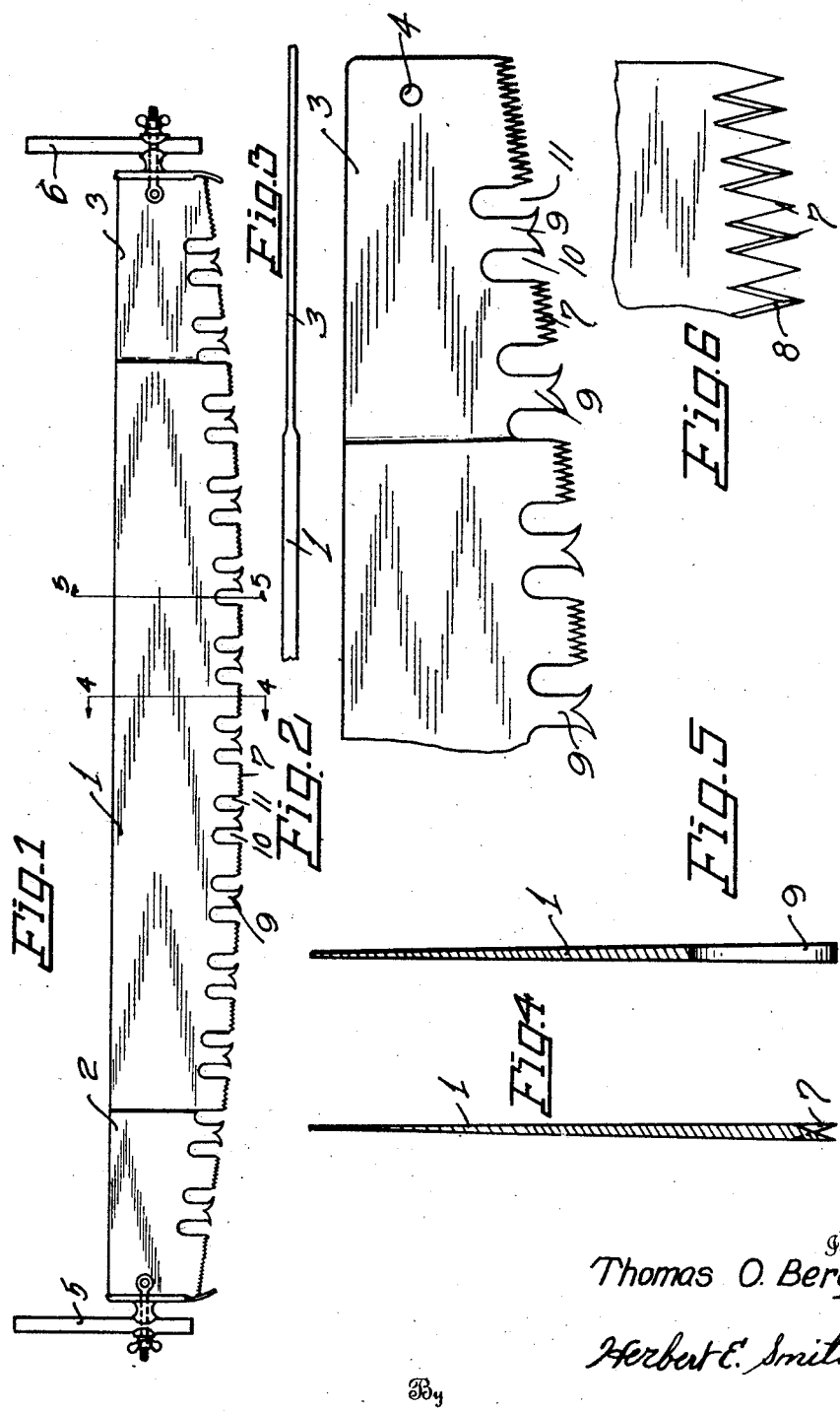

1,710,142

UNITED STATES PATENT OFFICE.

THOMAS O. BERG, OF PRIEST RIVER, IDAHO.

CROSSCUT SAW.

Application filed December 10, 1926. Serial No. 153,865.

My present invention relates to improvements in cross cut saws of the type employed by wood sawyers in getting out timber from the woods for saw mills, felling trees, and cutting the trees or logs into lengths of various sizes. As is well known to those familiar with this class of work, the cross cut saws now in use for this purpose require frequent attention of the saw filer and saw setter in order that the saws may be maintained in efficient working condition. In carrying out my invention the saw blade is constructed and the teeth are fashioned in such manner as to eliminate the necessity for filing and for re-setting the teeth due to wear, thus reducing the expense of maintenance of the saw and increasing the time for which it is available for use. For this purpose the saw blade has a tapered shape in cross section with a thick working or cutting edge where the teeth are formed and with the minimum thickness at the back edge of the blade. This construction also eliminates the possibility of binding or sticking of the saw with consequent vibrations, and insures an easy cutting motion At its ends the saw blade is fashioned with portions that are substantially thinner than the body of the saw blade, for use when a log lies upon the ground in such position that the walls of the back of the kerf are pinched together thus preventing or rendering difficult the passage of the main saw-blade body through the kerf. In such emergency one of the thinner ends of the blade is drawn into the kerf and the teeth of this thinner end used to complete the cut.

In fashioning the working or cutting edge of the saw blade a radius is provided for this cutting edge that insures a curvature by means of which the reciprocating saw will follow the cut in the log or tree and thus avoid and prevent the undesirable rocking motion of the saw frequently found under existing conditions with saws now in use.

The cutting and raking teeth are arranged along the working edge of the saw blade in such manner as to insure efficient cutting by the cutters together with proper clearance of the saw dust by the raker teeth from the kerf. My invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view in side elevation of a cross cut saw embodying the novel features of my invention.

Figure 2 is an enlarged view in side elevation at one end of the saw blade.

Figure 3 is an edge view of the portion of the saw blade shown in Figure 2.

Figure 4 is a cross section of the saw blade at line 4—4 of Figure 1 through the cutting teeth.

Figure 5 is a transverse sectional view at line 5—5 of Figure 1 through a clearance space adjoining a raker or scraper tooth.

Figure 6 is an enlarged view of one of the series of cutting teeth.

In carrying out my invention the saw blade is fashioned with a main body portion 1 and two end portions 2 and 3, the latter of sufficient length to be used in sawing the remainder of a log that has buckled and so closed its kerf as to render difficult the reciprocation therethrough of the body of the saw. The two end portions are of course provided with teeth in practically the same arrangement as that used for the body of the saw blade.

The end portions of the blade are fashioned with bolt holes as 4, and the usual handles 5 and 6 are secured at the ends of the blade to permit manipulation by the sawyers in usual manner.

The cutting teeth for the body of the saw blade as well as for the ends of the blade are arranged in groups indicated as 7, of which preferably eight teeth are used in a group, with the teeth beveled alternately as at 8 to form the oppositely arranged cutting edges.

The raker or scraper teeth 9 are much longer than the cutting teeth and a single raker tooth is located between a pair of groups of cutting teeth with clearance spaces 10 and 11 at the respective sides of the raker tooth. By this arrangement of the cutting teeth and raker teeth provision is made for efficiency in cutting and for the proper clearance of saw dust from the kerf being cut.

In Figures 1 and 4 the tapering form of the blade (in cross section) will be apparent and it will be seen that the opposed cutting teeth 7 in Figure 4 are cut from the blade without being distended therefrom as is customary in "setting" the teeth. As the maximum thickness of the blade thus occurs at the toothed edge and as the thickness of the blade diminishes from this edge to the back edge of the blade, it will be apparent that the teeth cut a kerf wider than the body of the blade to insure freedom of movement of the blade in the kerf. Due to the bias cut or arrangement of adjoining cutting teeth as seen in Figure 4 the teeth are automatically set as the work proceeds and re-setting on the part of a workman is not required.

In actual practice the working or cutting edge of the blade may be one-eighth of an inch thick and the blade then tapers down to say one sixty-fourth of an inch thickness at the back edge of the blade. I also find that a desirable curvature is fashioned for the cutting edge of the blade by using a radius or curve which drops say three-quarters of an inch for each foot length of the blade.

From the above description taken in connection with my drawings it will be apparent that I have provided a cross cut saw embodying various features by means of which time and labor are saved in the manipulation or use of the saw, and in which economy is secured in the maintenance of the saw in efficient working condition.

Having thus fully described my invention what I claim as new and desire to secure by Letters Patent is—

A cross-cut saw comprising a body portion merging by abrupt variations into end portion of materially less thickness, the saw tapering in cross-section from a maximum thickness at its cutting edge.

In testimony whereof I affix my signature.

THOMAS O. BERG.